US010988252B2

(12) United States Patent
Henry

(10) Patent No.: US 10,988,252 B2
(45) Date of Patent: *Apr. 27, 2021

(54) DRONEBOARDING SYSTEM WITH MECHANICAL FLIGHT CONTROL

(71) Applicant: David Edward Henry, Kailua, HI (US)

(72) Inventor: David Edward Henry, Kailua, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,209

(22) Filed: Jul. 31, 2018

(65) Prior Publication Data

US 2018/0346119 A1 Dec. 6, 2018

Related U.S. Application Data

(63) Continuation-in-part of application No. 15/613,218, filed on Jun. 4, 2017.

(51) Int. Cl.
| *B64C 39/02* | (2006.01) |
| *B63B 32/10* | (2020.01) |
| *B63B 32/70* | (2020.01) |
| *B63H 8/54* | (2020.01) |

(52) U.S. Cl.
CPC .......... *B64C 39/024* (2013.01); *B63B 32/10* (2020.02); *B63B 32/70* (2020.02); *B63H 8/54* (2020.02); *B64C 39/022* (2013.01); *B64C 39/026* (2013.01); *B64C 2201/024* (2013.01); *B64C 2201/042* (2013.01); *B64C 2201/108* (2013.01); *B64C 2201/12* (2013.01)

(58) Field of Classification Search
CPC . B63B 35/7993; B64C 39/022; B64C 39/026; B64C 31/06
See application file for complete search history.

(56) References Cited

U.S. PATENT DOCUMENTS

| 5,651,565 | A | * | 7/1997 | Liu | ........................ | A63C 11/221 |
| | | | | | | 135/75 |
| 6,345,843 | B1 | * | 2/2002 | Barnes | ....................... | A63C 5/06 |
| | | | | | | 280/819 |
| 2002/0124782 | A1 | * | 9/2002 | Starbuck | ............. | B63B 35/7979 |
| | | | | | | 114/39.21 |
| 2004/0004160 | A1 | * | 1/2004 | Pouchkarev | ........ | B63B 35/7933 |
| | | | | | | 244/146 |
| 2016/0083115 | A1 | * | 3/2016 | Hess | ......................... | B64F 3/02 |
| | | | | | | 701/3 |
| 2016/0141730 | A1 | * | 5/2016 | Shin | ..................... | H01M 2/1022 |
| | | | | | | 429/7 |
| 2016/0340006 | A1 | * | 11/2016 | Tang | ......................... | B63C 9/01 |
| 2017/0205820 | A1 | * | 7/2017 | Liu | ....................... | G05D 1/0016 |
| 2017/0259941 | A1 | * | 9/2017 | Briggs, IV | ............ | B64C 39/022 |
| 2019/0256215 | A1 | * | 8/2019 | Guo | ........................ | B64D 27/26 |
| 2019/0366375 | A1 | * | 12/2019 | Thompson | ............... | B64D 1/18 |

* cited by examiner

*Primary Examiner* — Timothy D Collins
*Assistant Examiner* — Terri L Filosi

(57) ABSTRACT

A droneboarding system is disclosed. The droneboarding system includes an unmanned aerial vehicle (drone) for pulling a droneboarder riding a board over a surface, a harness, a tow handle and a plurality of tension lines. Each tension line is attached to the drone and to either the tow handle or the harness. The tension lines are configured in a manner that provides mechanical control of the flight path of the drone. A remote power supply is adapted to be carried by the droneboarder. One of the tension line carries an electrical conductor from the remote power supply to the drone. The electrical conductor provides electrical power from the remote power supply to the drone.

16 Claims, 11 Drawing Sheets

DRONEBOARDING SYSTEM WITH MECHANICAL FLIGHT CONTROL

CROSS-REFERENCE TO RELATED APPLICATIONS

This application is a continuation-in-part of application Ser. No. 15/613,218, filed Jun. 4, 2017.

BACKGROUND OF THE INVENTION

Droneboarding is a relatively new recreational activity. Droneboarding is similar to the more established sport of kitesurfing, or kiteboarding. In kiteboarding, kiteboarders employ a large kite or sail to pull themselves over some surface, such as the surface of a lake or the ocean or, in colder climes, a snow-covered field. A kiteboarder typically rides a board adapted for the particular surface over which he or she intends to travel. For example, a kiteboarder kiteboarding on the ocean or on a lake may ride a surfboard, a wakeboard, a water ski, or the like; whereas a kiteboarder kiteboarding in the snow may ride a snowboard or skis.

A limitation of kiteboarding is that it is dependent on the wind. On calm days the avid kiteboarder must be content with other activities. Not only is kiteboarding dependent on the strength of the wind, but on the direction of the wind, as well. For example, a strong wind blowing onto shore can prevent ocean-bound kiteboarders from ever getting out onto the water. As any sailor knows, the wind can be a powerful, yet fickle, power source for propelling your craft.

Droneboarding solves this problem by replacing the kite with an unmanned aerial vehicle, or "drone." Whereas many people are familiar with relatively small drones, such as those supporting airborne video cameras or those that have been proposed for delivering packages, larger more powerful drones have been developed capable of pulling individuals over water and snow at exciting speeds. Employing a drone as the motive force in a droneboarding system greatly increases the opportunities and locations where one may enjoy the sport of "boarding" as compared to the opportunities and locations available when a kite is employed.

While solving some of the issues inherent in kiteboarding, droneboarding is itself not without challenges. The first is determining how to control the flight path of the unmanned aerial vehicle. In typical droneboarding systems, the individual being pulled by the drone has little or no control over the flight path of the drone. A companion is necessary to remotely pilot the craft. The remote pilot sends direction and speed commands to the drone via radio control signals. With this arrangement, the droneboarder, pulled along behind the drone, is simply along for the ride.

Another challenge inherent in using a drone to pull a droneboarder is providing sufficient power to the drone. Most unmanned aerial vehicles are electric powered. Onboard batteries supply direct current to electric motors that drive the propellers that create lift and provide forward propulsion to the craft. Pulling a human across the water or snow requires a significant amount of power. Onboard batteries powering a droneboarding drone are quickly depleted. Increased electrical storage capacity (more batteries) is required to extend the flight time of the drone and prolong the droneboarder's experience; however, increased storage capacity means increased weight, as batteries are heavy. In general, the larger the storage capacity of a battery, the heavier it is. At some point, the additional power provided by additional onboard batteries is consumed in getting the additional weight of the extra batteries off the ground.

For the sport of droneboarding to grow and thrive, solutions to these challenges are required. Droneboarding enthusiasts see a need for new mechanisms and methods for controlling the flight path of a drone. Preferably such new mechanisms and methods will allow the individual being pulled by the drone to control, or at least influence, the direction in which the drone is flying. Furthermore, droneboarders see a need for mechanisms that provide additional power to airborne drones. The additional power must be provided to the drone in a manner that does not significantly add to the weight of the craft.

SUMMARY OF THE INVENTION

The present invention provides a mechanism for allowing an individual being pulled behind an unmanned aerial vehicle (drone) to mechanically control and/or influence the flight path of the drone. The invention also provides a system in which additional electrical power is delivered to the drone via a remote power supply carried by the individual being pulled by the drone.

An embodiment of a droneboarding system includes a drone. A tension line attached to the drone is adapted to pull a user riding a board over a surface. A remote power supply adapted to be carried by the user provides power to the drone. An electrical conductor is carried to the drone by the tension line to provide operating power from the remote power supply to the drone.

Another embodiment of a droneboarding system includes a drone, a harness worn by a droneboarder, a tow handle and a plurality of tension lines. Each tension line attached to the drone and to either the tow handle or the harness in a manner that provides mechanical control of the flight path of the drone.

Yet another embodiment of a droneboarding system includes a drone, a harness worn by a user, and a tow handle for pulling the user over a surface. A left tension line extends between a left side of the handle and a left tension line attachment point located on a left side of the drone. A right tension line extends between a right side of the tow handle and a right tension line attachment point located on a right side of the drone. A center tension line extends between a center of the tow handle and a center tension line attachment point, wherein the center tension line attachment point is either substantially aft of the left and right tension line attachment points or substantially forward of the left and right tension line attachment.

Still another embodiment of the invention provides a drone system. The drone system includes a drone having a left front quadrant, a right front quadrant, a left rear quadrant and a right rear quadrant. A left tension line is attached to the drone at one or more left tension line attachment points. The left tension line attachment points are located within either the left front or left rear quadrant of the drone. A right tension line is attached to one or more right tension line attachment points. The right tension line attachment points are located within either the right front or right rear quadrants of the drone. A center tension line is attached at one or more center tension line attachment points located in the left rear or right rear quadrants of the drone. A tow handle is adapted to be gripped by a droneboarder to be pulled by the drone. The left tension line is fastened to a left side of the tow handle. The right tension line is fastened to a right side of the tow handle. The center tension line passes through the tow handle and is fastened to the harness worn by the droneboarder. A stopper is affixed to the center tension line at a point located between the tow handle and the drone.

Another embodiment of a droneboarding mechanical flight control system includes a drone and a tow handle. A left tension rod extends between a left side of the handle and a left tension rod attachment structure located on a left side of the drone. A right tension rod extends between a right side of the handle and a right tension rod attachment structure located on a right side of the drone. A center tension rod extends between a center of the tow handle and a center tension rod attachment structure. The center tension rod attachment structure may be either substantially aft of the left and right tension rod attachment structures or substantially forward of the left and right tension rod attachment structures.

DETAILED DESCRIPTION OF THE PREFERRED EMBODIMENTS

Figure 1:
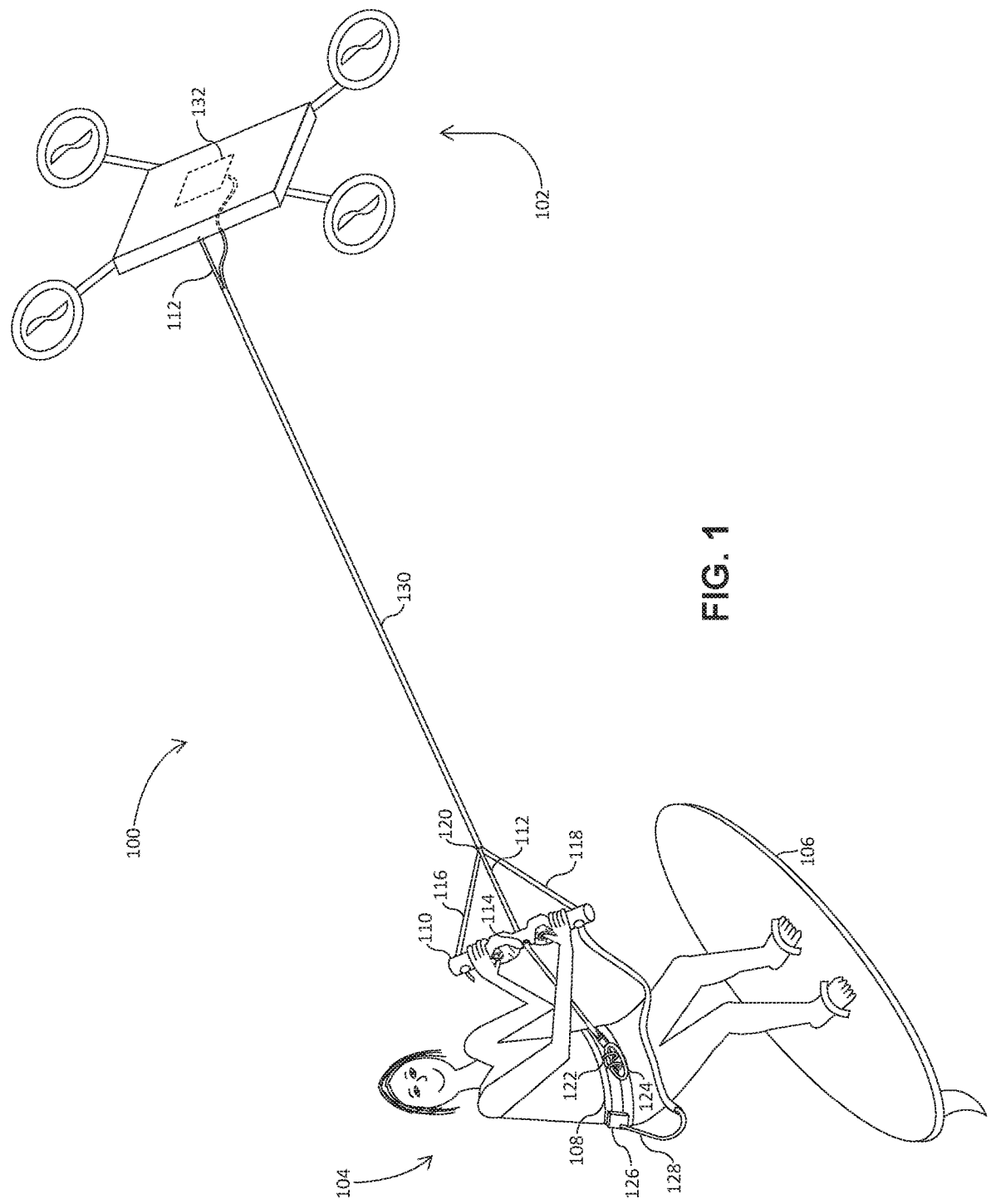
FIG. 1 depicts a droneboarding system according to an embodiment of the invention.

FIG. 1 shows the basic components of a droneboarding system 100 according to an embodiment of the present invention. The droneboarding system 100 includes an unmanned aerial vehicle (drone) 102 which is used to pull a user 104 riding a board 106 over a surface.

The drone 102 described herein is representative only. Features of the drone 102, such as the configuration of the drone, the size and number of propellers, the presence of an onboard power source, and the like, will vary depending on the make and model of the selected drone. All that is required of the drone is that it be large enough and have sufficient power to pull the user and the board on which the user is riding over the particular surface the board is adapted to travel. For purposes of the present disclosure, a generic four-propeller "quadcopter" is described.

The board 106 may be a surfboard, a kiteboard, a wakeboard, a snowboard, one or more snow skis or water skis, a skateboard or longboard, or any other type of board on which an individual may ride over a surface, be the surface water, snow, asphalt, concrete or some other surface. Employing a drone as the source of motive power provides much greater control over the direction and speed at which the droneboarder may travel. Such control offers much greater diversity in the locations where droneboarders may practice their sport. In the more confined spaces of urban or suburban locations, for example, a drone may be employed to pull skateboarders or long boarders along streets and sidewalks, parking lots, and the like. In some cases the board 106 may be discarded in favor of in-line skates, traditional roller skates, or even a bicycle. In winter a drone may be employed to pull ice skaters across a frozen lake, sleds or saucers across snow covered fields and the like.

The user 104 wears a harness 108 and holds a tow bar or handle 110. A tension line 112 is attached to the drone. The opposite end of the tension line 112 passes through a hole 114 near the center of the tow handle 110 and attaches to a double hook 122 or some other attachment mechanism mounted on the harness 108 via a quick release ring 124 attached to the end of the tension line 112. Left and right lateral stabilizing lines 116, 118 may be attached to the tension line 112 at an attachment point 120 located somewhere between the tow handle 110 and the drone 102, and to the left and right ends of the tow handle 110, respectively.

As will be described in more detail below, the harness 108 may include a battery pack 126 for providing either primary or auxiliary power to the drone 102 (in alternative embodiments the battery pack 126 may be carried in an arm or thigh band, a backpack, or in some other accessory worn by the user). A two-conductor flexible cable 128 extends from the power supply 126 to the tow handle 110 and is carried by the tension line 112 to the drone 102. The two-conductor cable 128 may be clipped to the tension line 112, wrapped around the tension line, integrally formed with the tension line, or as shown in FIG. 1, a flexible hollow sheath 130 may be provided encasing both the tension line 112 and the two-conductor cable 128. Near or at the drone 102, the two-conductor cable separates from the tension line 112 and connects to the internal power circuitry 132 of the drone.

Figure 2:
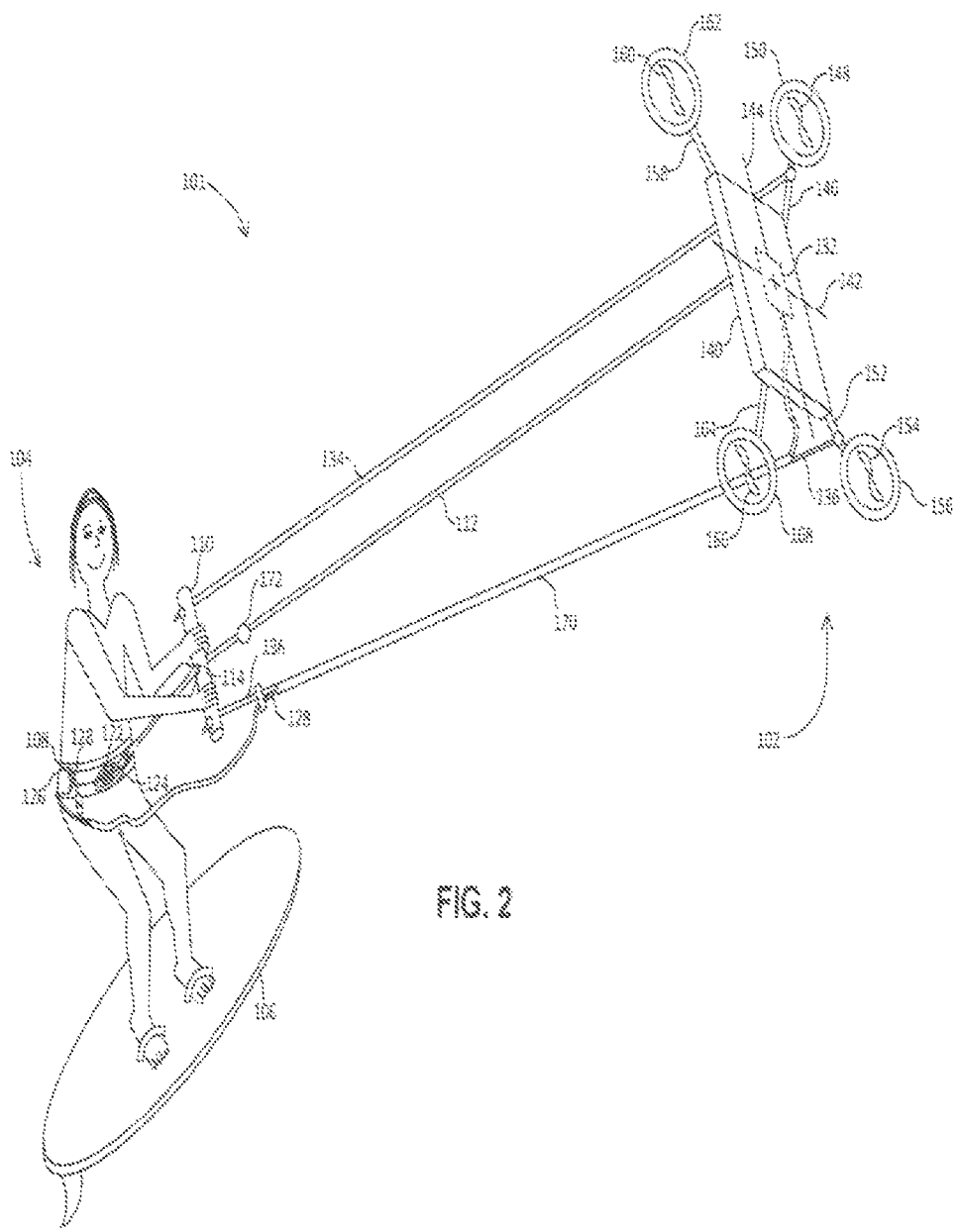
FIG. 2 depicts a droneboarding system according to another embodiment of the invention.

FIG. 2 shows an alternative embodiment of a droneboarding system 101. The droneboarding system of FIG. 2 is similar to the droneboarding system of FIG. 1. Like elements in both embodiments have been given identical reference numbers. Thus, the droneboarding system 101 of FIG. 2 includes a drone 102 pulling a user 104 riding a board 106. The user 104 wears a harness 108 and holds a tow handle 110. The harness 108 may included a battery pack 126 for providing electrical power to the drone 102. A tension line 112 attached to the drone extends from the drone to the tow handle 110 and passes through a hole 114 formed in the center of the tow handle 110 and attaches via a quick release ring 124 to a double hook 122 or some other fastening mechanism mounted on the harness 108. A tow-conductor cable 128 carries power from the power supply 126 to the drone 102.

The main difference between the droneboarding system of claim 101 of FIG. 2 and the droneboarding system 100 of FIG. 1 is that the left and right lateral stabilizing lines 116, 118 of droneboarding system 100 have been replaced with left and right tension lines 134, 136 which extend all the way from the tow handle 110 to the drone 102 itself. Thus, in this embodiment, the single tension line 112 of the droneboarding system 100 of FIG. 1 becomes the center tension line 112 in the droneboarding system 101 of FIG. 2. In the embodiment of FIG. 2, the two-conductor cable 128 is carried to the drone 102 via the right tension line 136 and the hollow sheath 170; however, those skilled in the art will recognize that the two-conductor cable 128 could just as well be carried to the drone 102 via the left tension line 134 or center tension line 112. A buoyant stopper 172 may be attached to the center tension line 112. The buoyant stopper floats in case the droneboarder becomes separated from the the drone in open water. In such a case, the stopper 172 and the tow handle 110 will float so that the droneboarder may quickly locate the tow handle 110 and regain control of the drone 102. As will be described below, having the three tension lines 134, 136, 112 attached to the drone in the manner shown in FIG. 2 provides significant mechanical advantages for controlling the flight path of the drone 102.

The drone 102 depicted in FIG. 1 and FIG. 2 is configured as a "quadcopter," having four propeller assemblies symmetrically arrayed about a central body 140. A left front post 146 extends from the left front quadrant of the drone body 140 to support the left front propeller 148 and the left front propeller guard 150. A right front post 152 extends from the right front quadrant of the drone body 140 to support the right propeller 154 and the right front propeller guard 155. A left rear post 158 extends from the left rear quadrant of the drone body 140 to support the left rear propeller 160 and the left rear propeller guard 162. Finally, a right rear post 164 extends from the right rear quadrant of the drone body 140 to support the right rear propeller 166 and the right rear propeller guard 168. The drone 102 is substantially symmetrical left to right about a longitudinal centerline 142 and front to back about a lateral centerline 144. Again, it should be noted that the drone 102 is illustrative only. The number of propellers may vary, the propeller guards may or may not be included, the manner in which the propellers are attached to the body of the drone (i.e. the posts 146, 152, 158, 164) may be altered or eliminated altogether, without deviating from the inventive concept of the present invention.

In the embodiment shown in FIG. 2, the left tension line 134 is attached to the left front post 146 that connects the left front propeller 148 to the main body 140 of the drone 102. The right tension line 136 is similarly attached to the right front post 152 connecting the right front propeller 154 to the main body 140 of the drone 102. The center tension line 112 is attached to the rear of the main body 140 of the drone 102. The connection points shown in FIG. 2 are illustrative only. Alternative arrangements are possible without departing from the inventive concept of the present invention. For example, the left and right tension lines may each be split into two or more strands which are attached to the drone 102 at multiple locations within the left-front and right-front quadrants of the drone 102, respectively. Similarly, the center tension line 112 may be split into two or more strands that attach at multiple locations in the rear half of the craft. For purposes of the embodiment illustrated in FIG. 2, the left tension line 134 is attached at one or more points in the left front quadrant of the drone 102; the right tension line 136 is attached at one or more points in the right front quadrant of the drone 102, in a manner similar to that of the left tension line 134; and the center tension line 112 is attached at one or more points aft of the points where the left and right tension lines 134, 136 attach to the drone 102, preferably well aft of the lateral centerline 144 of the drone 102. The opposite end of the left tension line 134 is fastened to the left side of the tow handle 110 (passing through hole formed in the left side of the tow handle 110 and tied off with a knot.) The opposite end of the right tension line 136 is fastened to the right side of the tow handle 110 in the same manner as the left tension line 134. As has already been described, the opposite end of the center tension line passes through a hole 114 formed in the center of the tow handle 110 and attaches to a double hook 122 or some other fastening mechanism attached to the harness 108 worn by the user 104 via a quick release ring 124. Alternatively, the center tension line may pass through the hole 114 in the center of the tow handle 110 and be held in place with a stopper (not shown) affixed to the line.

The three-tension-line configuration affords greater mechanical control of the orientation of the drone 102 than the single-tension-line arrangement of FIG. 1. The lengths of the left and right tension lines 134, 136 are fixed. Accordingly, when the two lines are under tension, the distances between the tow handle 110 and the left front post 146 and the right front post 152 (the points where the left and right tension lines attached to the drone 102) will not change. The length of the center tension line 112 is also fixed, but the center tension line 112 is attached to the user 104, not to the tow handle 110. The tow handle is free to pass up and down along the length of the center tension line 112. Moving the tow handle closer to or further away from the user 104 will have little or no impact on the center tension line 112; however, moving the tow handle closer to, or further away from, the user 104, will have a significant impact on the left and right tension lines 134, 136.

Pulling the left end of the tow handle 110 toward the user 104 pulls the left front quadrant of the drone 102 toward the user 104. Given the orientation of the drone 102 and user 104, this means pulling the front left quadrant of the drone down and back relative to the other quadrants of the craft. Similarly, pulling the right end of the tow handle toward the user 104 pulls the right front quadrant of the drone 102 toward the user, in other words down and back relative to the other quadrants of the craft. Pulling both ends of the tow handle 110 back toward the user simultaneously pulls both the left and right front quadrants of the drone down and back relative to the rear half of the craft. Conversely, pushing the left end of the tow handle 110 away from the user 104 allows the left front quadrant of the drone 102 to move away from the user 104 (up and forward relative to the other quadrants of the craft). Pushing the right end of the tow handle 110 away for the user 104 allows the right front quadrant of the drone 102 to move away from the user 104 (again, up and forward relative to the other quadrants of the craft). In practical effect, pulling the tow handle 110 toward the user increases the forward angle of the craft, causing the craft to pull more strongly in the forward direction. Pushing the tow handle away from the user decreases the forward angle of the craft, reducing the forward pull of the craft. Pulling only the left end of the tow handle 110 toward the user 104 alters the flight angle of the craft to a more forward/left orientation, causing the drone 102 to pull the user 104 in a more leftward direction. Similarly, pulling only the right end of the tow handle 110 toward the user 104 alters the flight angle of the craft to a more forward/right orientation, causing the drone to pull the user 104 in a more rightward direction.

Releasing the tow handle 110, in the event the droneboarder takes a spill, for example, will have an effect similar to pushing the tow bar away from the droneboarder 104. The forward half of the drone 102 being unrestrained by the pull of the droneboarder will begin to rise, pulling the tow handle 110 forward relative to the center tension line 112. Since the tow handle 110 passes freely over the center tension line 112, the tow handle 110 will travel up the center tension line 112 until it is stopped by the buoyant stopper 172. The buoyant stopper 172 is positioned along the center tension line 112 such that, when the tow handle is butting up against the buoyant stopper 172, the lengths of the left, right, and center tension lines 134, 136, 112, from the tow handle 110 to the drone 102 are substantially the same, so that the drone 102 will tend to level off and hover in place of its own accord. Thus, the droneboarder who has released the tow handle 110 may quickly locate and retrieve the tow handle 110 which will be hanging directly below the hovering drone 102

In an alternative embodiment of the invention, the attachment points between the tension lines and the drones may be reversed. The left tension line 134 may be attached to one or more points in the left rear quadrant of the drone 102, and the right tension may be attached to one or more points in the right rear quadrant of the drone 102. The center tension line 112 may be attached at one or more points forward of the left and right tension line attachment points, preferably at one or more points in the front half of the drone 102. With this arrangement, pulling the tow handle 110 toward the user will pull the back half of the drone 102 downward, reducing the forward angle of the craft, and thus reducing the forward pull of the craft. Pushing the tow handle away from the user will cause the back half of the drone 102 to rise relative to the front of the craft, thereby increasing the forward angle of the drone 102 and increasing the forward pull of the craft. Pushing the left side of the tow handle 110 away from the user will allow the left rear quadrant of the drone 102 to rise, causing the drone 102 to veer to the right. Similarly, pushing the right end of the tow handle 110 away from the user will cause the right rear quadrant of the drone 102 to rise relative to the rest of the craft, causing the drone 102 to veer to the left.

In a variation of the embodiment just described, the center tension line 112 may be knotted off at the tow handle 110 rather than passing freely therethrough. Instead, both the left and right tension lines 134, 136 may be allowed to pass freely through the tow handle 110 to connect to the harness 108 worn by the user. This arrangement will allow mechanical throttle control of the drone 102 by altering the attitude of the drone based on the position of the tow handle 110 relative to the user, but will not provide much in the way of mechanical steering of the drone 102 to the left and right.

Figure 3:
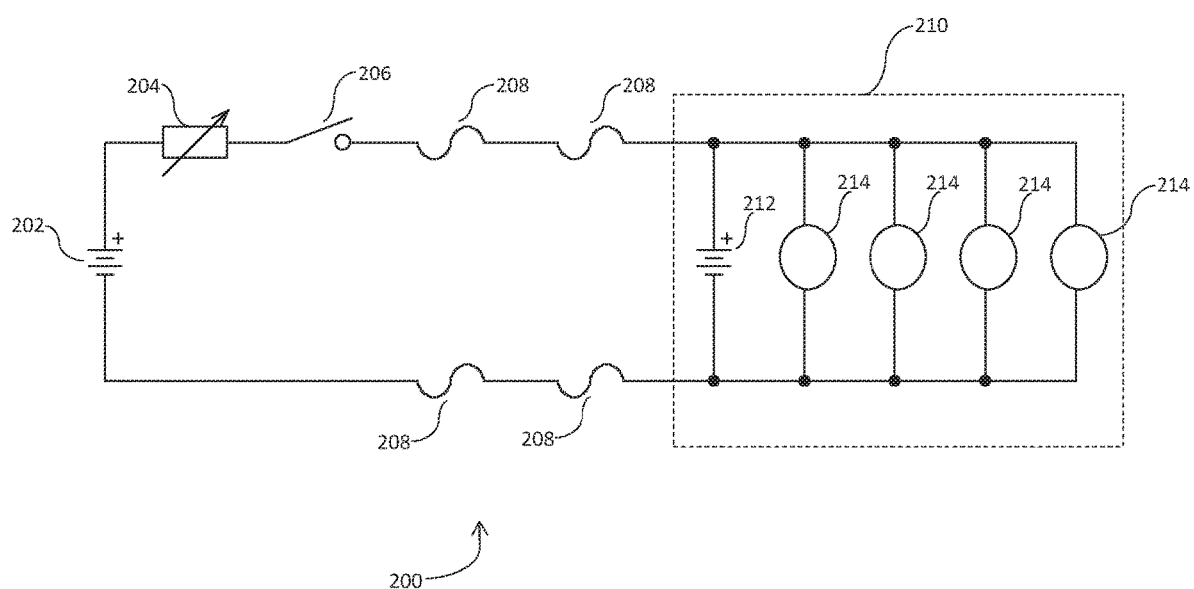
FIG. 3 is a schematic diagram of a circuit for providing remote power to an unmanned aerial vehicle.

FIG. 3 shows a schematic diagram of a circuit 200 for providing remote power to an unmanned aerial vehicle (drone) 210 according to an embodiment of the present invention. The circuit 200 includes a remote battery 202, a rheostat 204 (or other variable resistance component such as a potentiometer, or the like), a switch 206, and fuses 208. The battery 202 may comprise a single battery cell or a plurality of battery cells connected in parallel or series with one another, or a plurality of battery cells connected in some series/parallel combination as the voltage and current requirements of the craft demand. The rheostat 204, the switch 206, and the fuses 208 are all optional. The rheostat 204 is provided to alter the resistance of the circuit 200, thereby altering the current supplied to the drone. The rheostat may be located such that it is easily accessible to the user and may be used as a throttle to control the speed and thrust of the drone 210. Alternatively, the rheostat may be set to provide a desired fixed current to the drone. In this case, the rheostat need not be accessible to the user while the circuit is in use. In many cases the drone will have its own internal battery 212. Additionally, each propeller on the craft will typically be driven by a separate electrical motor 214. The remote battery 202 may be connected in parallel with the drone's internal battery 212 as shown, or the remote battery 202 may be connected directly to drone's internal power circuitry for driving the individual motors 214 powering the drone's propellers directly. Fuses 208 may be provided to protect against power surges, such as, for example, if the drone 210 were to be struck by lightning or become entangled with electrical power lines.

Figure 4:
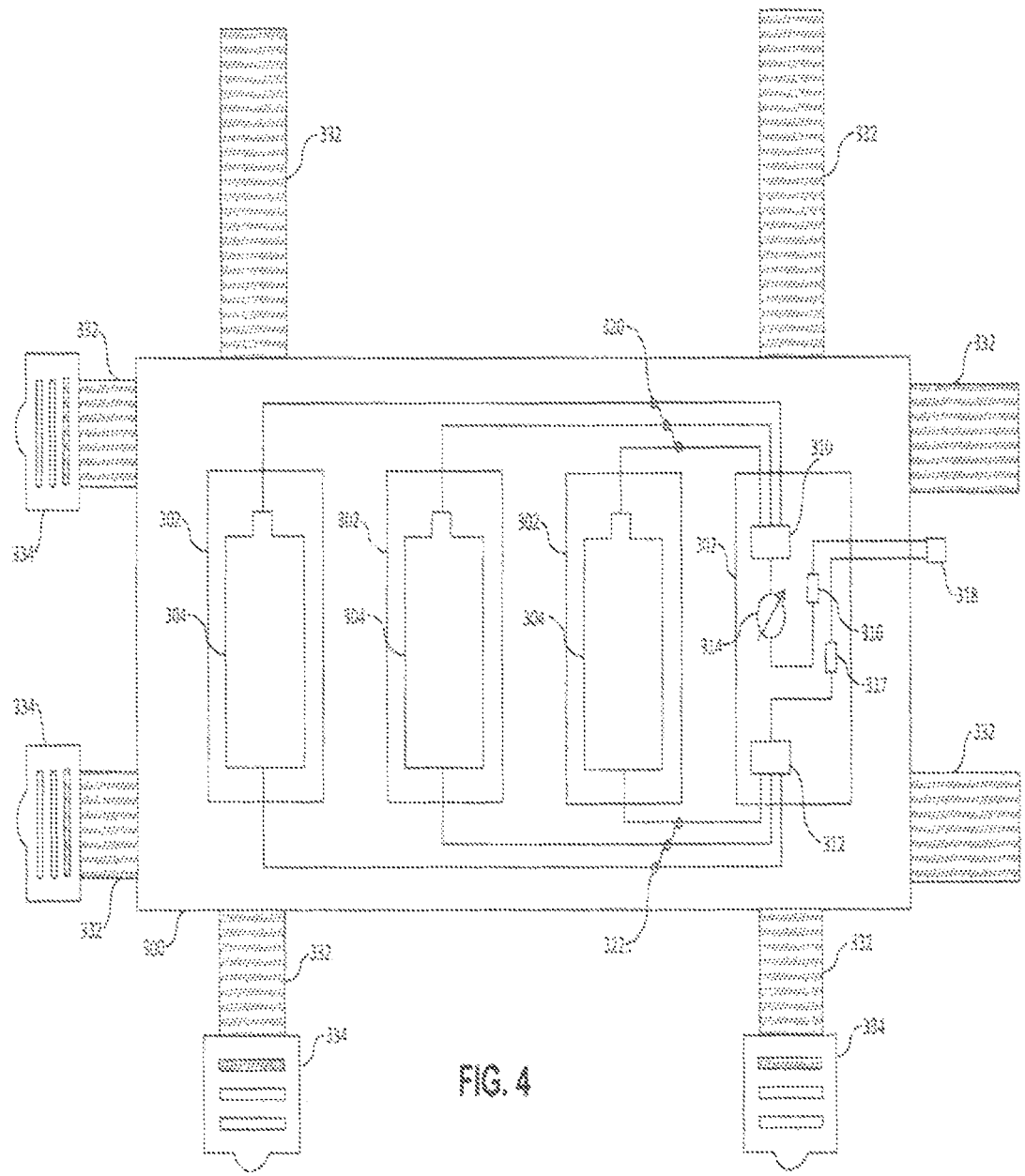
FIG. 4 is a simplified two-dimensional representation of a battery pack for providing remote power to an unmanned aerial vehicle.

FIG. 4 is a simplified schematic representation of a battery pack 300 for use in a droneboarding system according to an embodiment of the invention. The battery pack 300 includes a number of compartments or pockets 302. The pockets 302 are adapted to hold batteries 304 or additional circuitry such as positive and negative power distribution blocks 310, 312, rheostat 314 and fuses 316, 317. Additional soft buoyant material such as foam or sponge material may be packed into the pockets 302 to protect the batteries and other circuit elements within the pockets 302 and to increase the overall buoyancy of the battery pack 300. Positive wires 320 connect the positive terminals of the batteries 304 to a positive power distribution block 310. Negative wires 322 connect the negative terminals of the batteries 304 to a negative power distribution block 312. Further electrical connections are made between the positive power distribution block 310 and the rheostat 314, and between the rheostat 314 and an optional fuse 316. The output of fuse 316 (or the output of rheostat 314 if optional fuse 316 is omitted) is connected to one pole of a two-pole electrical connector 318. The negative power distribution block 312 is connected to fuse 317, and from there to the other pole of the two-pole electrical connector 318 for releasably connecting the battery pack to a mating connector on external wiring that carries power to the drone. Electrical connector 318 may be an SAE 2-pin connector, a stereo jack or plug, or the like. Additional compartments or pockets 302 (not shown) may be provided for holding foam, sponge, or some other soft buoyant material for protecting the batteries and providing additional buoyancy to the battery pack 300 so that the battery pack will float in the event the battery pack becomes detached from the user over a body of water. The battery pack 300 may include vertical or horizontal straps 332 and buckles 334 for attaching the battery pack 300 to a harness or some other article worn by the user, or alternatively for attaching the battery pack 300 directly to the user's body.

Figure 5:
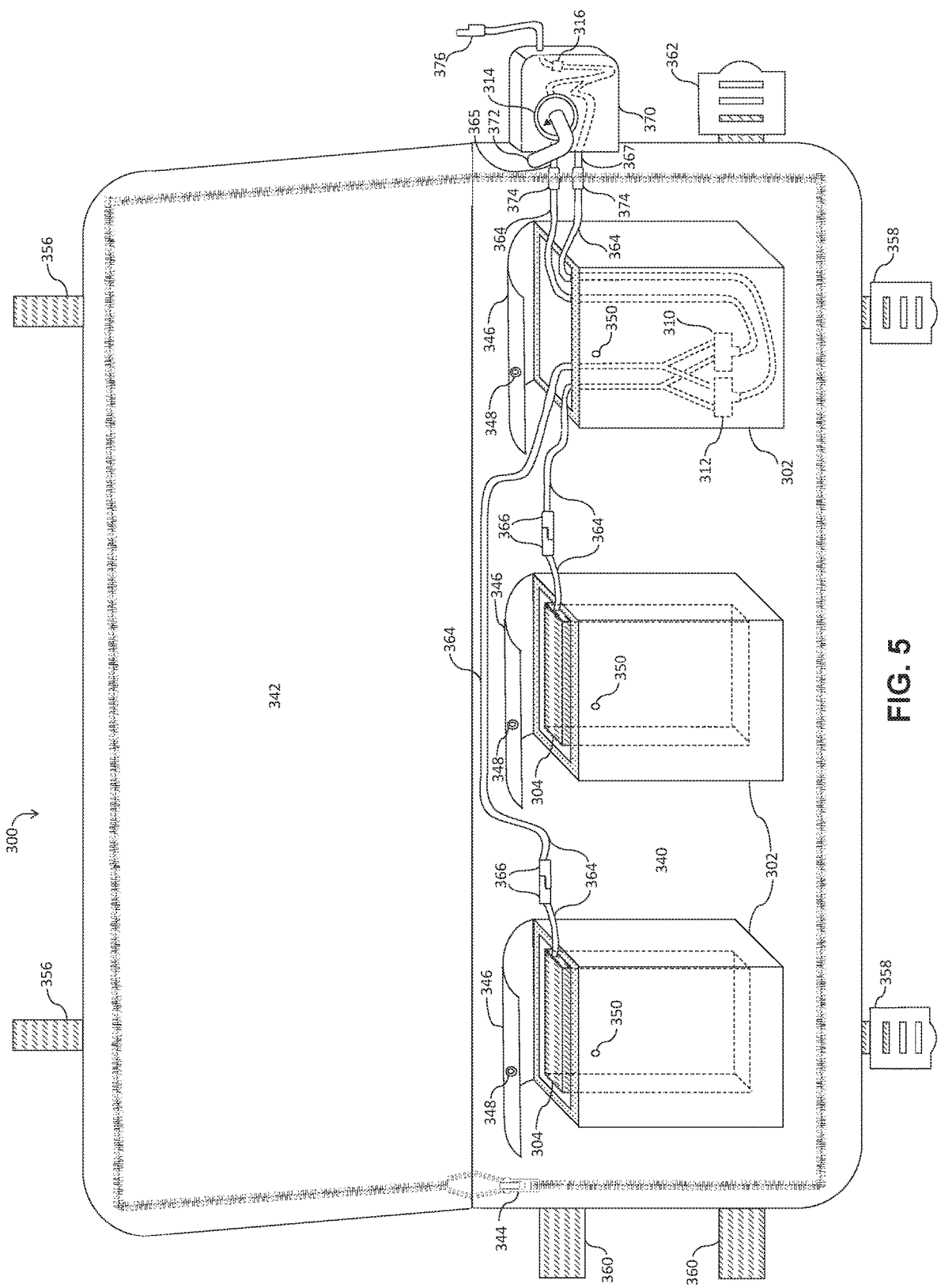
FIG. 5 is a three-dimensional representation of a battery pack for providing remote power to an unmanned aerial vehicle.

FIG. 5 is a three-dimensional physical representation of the battery pack 300 shown in FIG. 4. The battery pack 300 includes a rear panel 340 and a hinged cover panel 342 attached to the rear panel 340 such that the cover panel 342 may be folded over the rear panel 340 to cover the electrical components housed within the battery pack 300. A zipper 344 may be provided to close the battery pack 300 while the battery pack is in use, while also allowing easy access to the batteries 304 and other components within the battery pack 300 in order to change batteries 304 and/or replace various other components as needed. The rear panel 340 and cover 342 may be formed from multiple layers of neoprene covered in a durable fabric. Alternatively, the rear panel 340 and cover 342 may be formed of plastic, metal, wood, leather, rubber, or any other suitable material.

The pockets 302 for holding the batteries 304 and other electrical components may comprise the same durable fabric as that covering the rear panel 340 and cover panel 342. The pockets 302 may include fabric covers 346 for securing the batteries 304 and other electrical components within the pockets 302. The pocket covers 346 may include snap rings 348, adapted to engage snap posts 350 attached to the pockets 302 themselves for releasably securing the pocket covers 346 over the pockets 302. Foam, sponge, or some other buoyant material may also be attached to the rear panel 340 of the battery pack 300 to provide additional bouncy to the battery pack 300.

The positive and negative wires 320, 322 for connecting the positive and negative terminals of the batteries 304 to the positive and negative distribution blocks 310, 312 in FIG. 4 may be combined into two-conductor cables 364. In FIG. 5, electrical connectors 366 may be interposed between the batteries 304 and the positive and negative power distribution blocks 310, 312 so that individual batteries may be easily swapped out to be recharged or replaced after their charge has been depleted.

The battery pack 300 may include vertical straps 356 and buckles 358 adapted to attach the battery pack 300 to a harness, such as harness 108 in FIG. 1. Alternatively, the battery pack 300 may include one or more horizontal straps 360 and buckles 362 whereby the battery pack 300 may be secured to the user's thigh or upper arm, or elsewhere on the user's body.

A difference between the battery pack 300 shown schematically in FIG. 4 and the 3-dimensional representation of a battery pack 300 in FIG. 5 is that the rheostat 314 and fuse 316 have been removed from one of the internal pockets 302 of the battery pack 300 and placed in an external rheostat case 370. The external rheostat case 370 may be attached to an outer surface of the battery pack 300 by stitching, by an adhesive, or by some other attachment means. Alternatively, the rheostat case 370 may be attached directly to the harness on which the battery pack is mounted.

The rheostat case 370 includes a rheostat handle 372. The rheostat handle 372 allows a user to manually adjust the resistance of the rheostat to control the electrical current provided to the drone, thereby acting as a throttle for controlling the pulling force of the drone. Electrically, the external rheostat 314, is connected to the positive and negative distribution blocks 310, 312 by a pair of wires 365, 367 that pass into the battery pack through a pair of rubber plugs 374. The output lead from the rheostat along with the negative battery lead exit the rheostat case 370 via a two-conductor cable, which terminates at a first half of a two-pole electrical connector 376.

Figure 6:
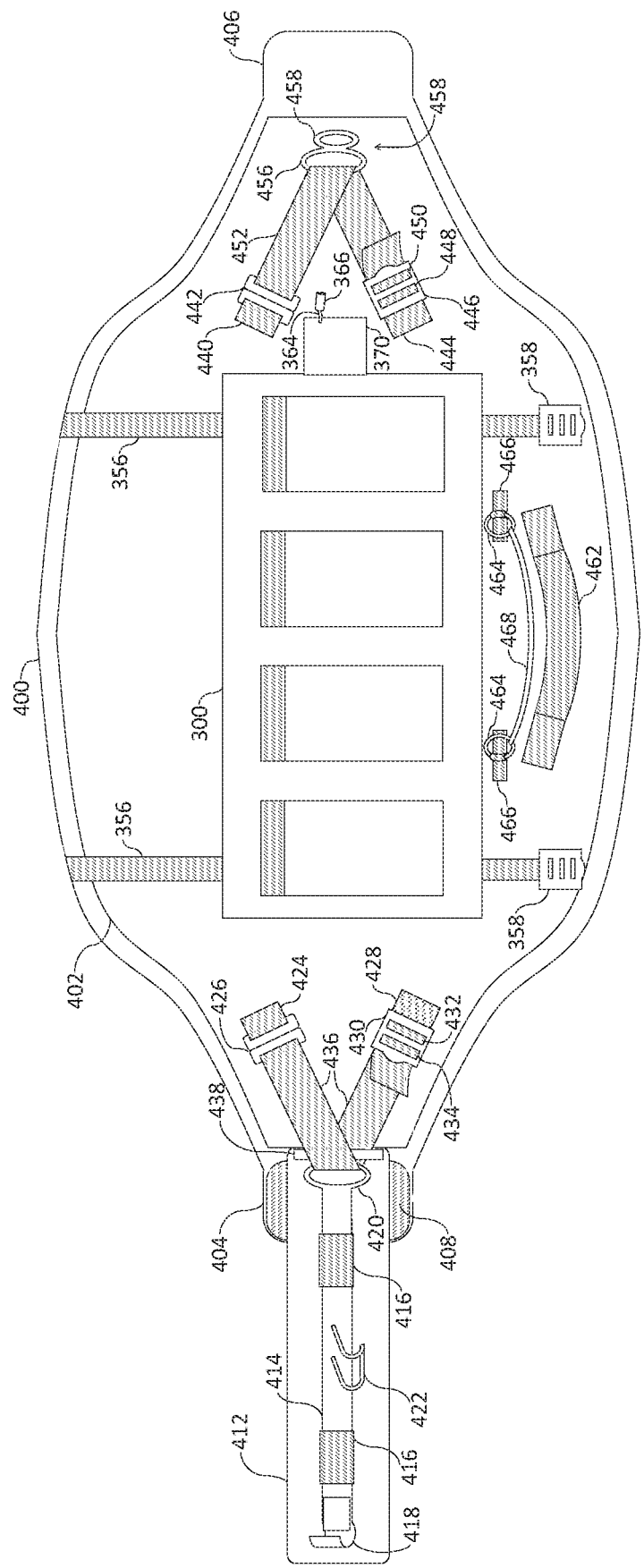
FIG. 6 is a view of the outward facing side of a droneboarding harness having a battery pack attached thereto.
Figure 7:
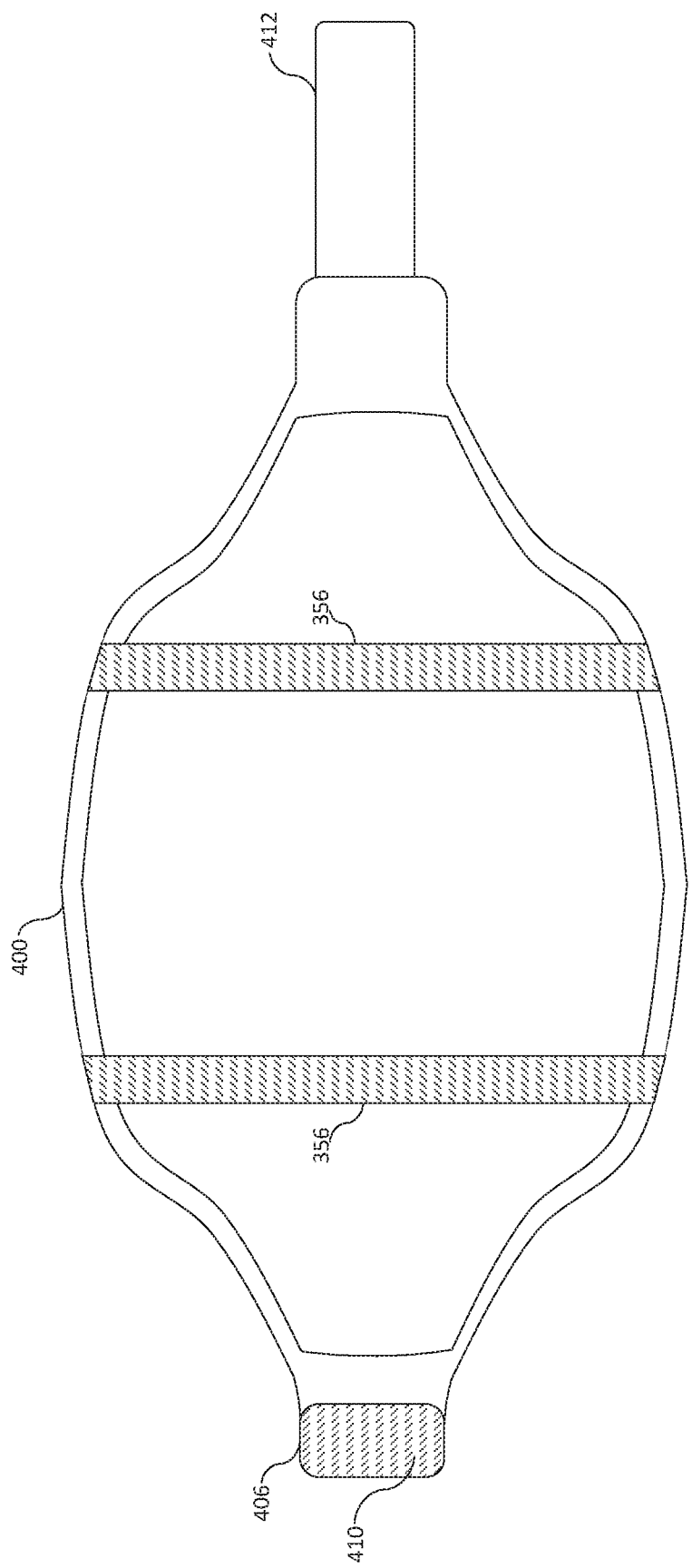
FIG. 7 is a view of the inward or user facing side of the harness of FIG. 6.

FIG. 6 and FIG. 7 show the manner in which a battery pack 300 is secured to a droneboarding harness 400. FIG. 6 shows the outer surfaces of the droneboarding harness 400 that face away from the user's body when the user is wearing the harness 400, and FIG. 7 shows the inner surfaces of the harness that contacts the user's body when the user is wearing the harness 400. The drone harness includes a relatively wider back portion 402 adapted to be worn around a user's lower back. The wider back portion 402 of the harness gradually tapers into left and right flaps 404, 406 which are adapted to wrap around the user's body where they may be fastened together over the user's mid-section. A front belt portion 412 is also adapted to be secured across the user's abdomen and is adapted to be secured to the drone.

An outer surface of the left flap 404 is covered with one side of a hook and loop fastening material 408. Likewise, an inner surface of the right flap 406 is covered with the opposite side of a hook and loop fastening material 410. When the harness is wrapped around a user's body, the left and right flaps may be securely fastened together by pressing together the opposing sides of the hook and loop fastening material covering the outer surface of the left flap 404 and the inner surface of the right flap 406.

The front belt portion 412 includes a pair of securing loops 416 adapted to secure a metal bar 414 to the harness 400. The securing loops 416 may be made of any heavy-duty fabric stitched to the front belt portion 412 of the harness 400 in a manner sufficiently strong to withstand the force of the drone pulling the user. The metal bar 414 includes a safety clip 418 attached at one end, and a metal bar loop 420 at the other. A double hook 422 adapted to receive a quick release ring is attached near the center of the metal bar 414.

A left adjusting strap 436 is provided to secure and adjust the lateral position of metal bar 414. The left adjusting strap 432 436 may be attached to the harness 400 by means of a left double-ring buckle 426 and a left adjustable buckle 430. The left double-ring buckle 426 is secured to the upper left side of the harness 400 by an upper left secured strap 424. The upper left secured strap 424 is stitched or otherwise attached to the harness 400. The upper left secured strap 424 passes through one ring of the left double-ring buckle 426 and loops back on itself where it is stitched to itself or otherwise secured to itself or to the harness 400. Likewise, the left adjustable buckle 430 is attached to the lower left side of the harness 400 by a lower left secured strap 428. The lower left secured strap 428 is stitched or otherwise attached to the harness 400. The lower left secured strap 428 passes underneath the adjustable buckle 430 and wraps around a first post 432 in buckle 430. The lower left secured strap 428 then loops back on itself and is stitched to itself or otherwise secured to itself or to the harness 400. The left adjusting strap 436 passes through the outer ring of the left double-ring buckle 426 and loops back on itself where it is stitched to itself to secure the left adjusting strap 436 to the double-ring buckle 426 and hence to the harness 400. The left adjusting strap 436 then passes through the metal bar loop 420 formed at the end of the metal bar 414, through the belt loop 438, and back to the left adjustable buckle 430. The left adjusting strap 436 then passes underneath the left adjustable buckle 430 and wraps around the second post 434 of the left adjustable buckle 430. The end of the left adjusting strap may then be pulled tight through the adjustable buckle 430 to adjust the tension on the metal bar 414.

A right adjusting strap 452 is provided similar to the left adjusting strap 436. The right adjusting strap 452 may be attached to the harness 400 by means of a right double-ring buckle 442 and a right adjustable buckle 446. The right double-ring buckle 442 is secured to the upper right side of the harness 400 by an upper right secured strap 440. The upper right secured strap 440 is stitched or otherwise attached to the harness 400. The upper right secured strap 440 then passes through one ring of the right double-ring buckle 442 and loops back on itself where it is stitched to itself or otherwise secured to itself or to the harness 400. Likewise, the right adjustable buckle 446 is secured to the lower right side of the harness 400 by a lower right secured strap 444. The lower right secured strap 444 is stitched or otherwise attached to the harness 400. The lower right secured strap 444 passes underneath the right adjustable buckle 446 and wraps around a first post 448 in buckle 446. The lower right secured strap 444 then loops back on itself where it is stitched to itself or otherwise secured to itself or to the harness 400. The right adjusting strap 452 passes through the outer ring of the right double-ring buckle 442 and loops back on itself where it is stitched to itself to secure the right adjusting strap 452 to the right double-ring buckle 442 and hence to the harness 400 itself. The right adjusting strap 452 then passes through the larger ring 456 of a two-ring clasp 454. The right adjusting strap 452 then returns to the right adjustable buckle 446. The right adjusting strap 452 then passes underneath the right adjustable buckle 446 and wraps around the second post 450 of the right adjustable buckle 446. The end of the right adjusting strap 452 may then be pulled tight through the right adjustable buckle 446 to adjust the tension on the two-ring clasp 454.

When donning the harness, the user wraps the front belt portion 412 of the harness 400 around his or her lower abdomen and clips the safety clip 418 over the smaller ring 458 of the two-ring clasp 454. The user may then pull on the loose ends of the left and right adjusting straps to tighten the harness around the user's body.

The battery pack 300 is secured to the harness 400 by vertical straps 356. The vertical straps 356 wrap around the wide central portion 402 of the harness 400 and are secured and tightened via adjustable buckles 358. The battery pack 300 includes the external rheostat case 370. As can be seen, the two-conductor cable 364 exits the rheostat case 370 and terminates at one half of a two-pole electrical connector 366. The electrical connector 366 is adapted to mate with a similar but opposite half of a two-pole connector attached to the long lead that carries power to the drone via one of the tension lines, as has already been described.

The harness 400 may also include a handle 462 made of a heavy-duty fabric stitched to or otherwise attached to the harness 400. Finally, a safety leash attachment cord 468 is attached to the harness via two safety leash attachment rings 464. The safety leash attachment rings 464 are themselves attached to the harness 400 via a pair of safety leash secured straps 466 which are stitched or otherwise attached to the harness.

Figure 8:
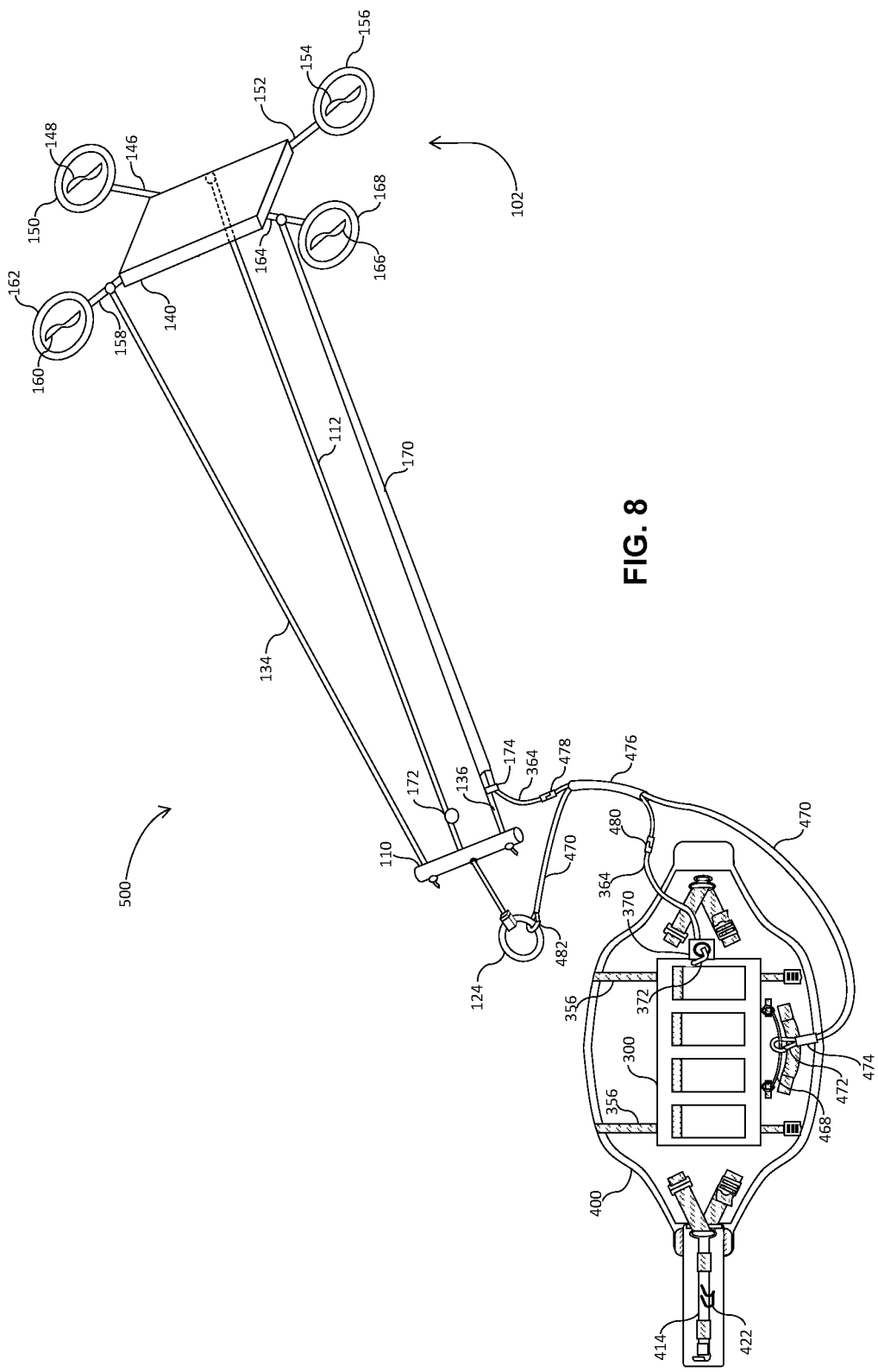
FIG. 8 is an illustration of the major interconnected components of a droneboarding system.

FIG. 8 shows the major components of a droneboarding system according to an embodiment of the invention. For simplicity of explanation, components that have already been described have been given the same reference numbers as in earlier drawings. Thus, a droneboarding system 500 includes a drone 102 having a drone body 140, a plurality of propellers 148, 154, 160, 166 and propeller guards 150, 156, 162, 168. In this embodiment, the locations of the tension line attachment points on the drone have been reversed. Thus, a left tension line 134 attaches to a left rear post 158, and a right tension line 136 attaches to a right rear post 164. A center tension line 112 attaches to a front side 141 of the drone body 140. The left tension line 134 is fastened to the left side of a tow handle 110, and the right tension line is fastened to the right side of the tow handle 110. The center tension line 112 passes through the tow handle 110 and terminates at a quick release ring 124. The droneboarding system 10 further includes a harness 400. The harness 400 includes, among other things, a front metal bar 418 having a double hook 422 connected thereto. When the harness 400 is being worn by a user, the double hook is arranged such that the double hook may receive the quick release ring 124 attached to the end of the center tension line 112 to secure the drone 102 to the user. A battery pack 300 is secured to the harness 400 via straps 356. A rheostat case 370 housing a rheostat and having a rheostat adjustment handle 372 is externally attached to the battery pack 300. A two-conductor cable 364 exits the rheostat case 370 to carry power from the battery pack 300 to the drone 102. A pair of two-pole quick release electrical connectors 478, 480 may be provided to divide the two-conductor cable 364 into detachable segments so that the battery pack may be quickly detached from the drone, both physically and electrically, in case of an emergency. As mentioned earlier, the connectors 478, 480 may comprise an SAE 2-pin connector or the like. A safety leash 470 may be clipped to a safety leash attachment cord 468 securely fastened to the harness 400. The safety leash clip 472 may have a quick release mechanism associated therewith for quickly detaching the safety leash 470 from the harness in case of an emergency. The safety leash 470 itself and the two-conductor cable 364 run together through a safety leash sheath 476. The safety leash sheath 476 may comprise a hollow band of elastic material or plastic. Upon exiting the safety leash sheath 476, the safety leash 470 may be attached to the quick release ring 124 attached to the end of the center tension line 112 via a safety clip 482. Alternatively, the safety clip 482 may be clipped onto a ring fastened to the knot of the left tension line 134 or onto a ring fastened to the knot of the right tension line 136. It could alternatively be clipped onto a ring attached to the center tension line 112.Upon exiting the safety leash sheath 476, the two-conductor cable 364 is fastened to the right tension line 136 via a cable fastener 174. The cable fastener may be plastic zip-tie, a short section of two-sided hook and loop ribbon, or the like. A hollow sheath 170 associated with the right tension line 136 carries the two-conductor cable 364 to the drone. At the drone, the two-conductor cable exits the hollow sheath 170 and connects to drone's power circuitry 132. A stopper ball 502 is attached to the center tension line 112 at a point between the tow handle 110 and the drone 102. The stopper ball 502 is positioned such that, if the user lets go of the tow handle 110, and the tow handle 110 is against the stopper ball 502, the drone 102, while still under power, will fly substantially parallel to the ground, and will therefore hover in place. Thus, if the user falls and lets go of the tow handle, the drone will hover until the user retakes control of the tow handle 110. If the user instead wants to cause the drone to lose power, the user could pull one of the quick release connectors 478, 480 killing remote power to the drone.

The droneboarding system 500 provides a mechanism whereby the user riding a board and being pulled over a surface by a drone may mechanically influence the flight path of the drone. The droneboarding system further provides a remote source of power for powering the drone. The remote power source provides such power in a manner that does not substantially increase the weight needed to be lifted by the drone.

Figure 9:
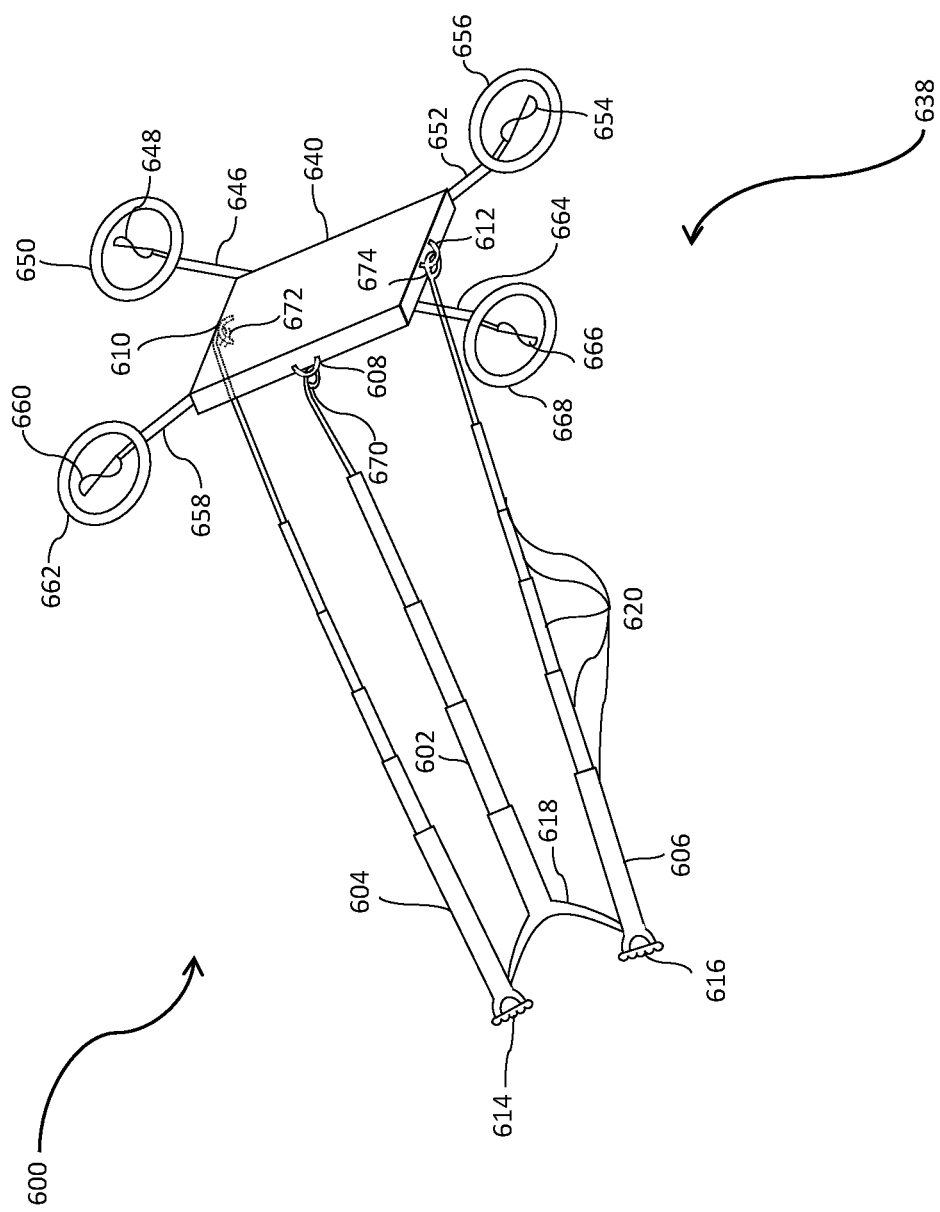
FIG. 9 depicts a droneboarding system according to another embodiment of the invention.

An alternative embodiment of a droneboarding mechanical flight control system 600 is shown in FIG. 9. Like the previously described embodiments, the droneboarding flight control system 600 is provided for controlling the flight path of a drone adapted for pulling a droneboarder over a surface. FIG. 9 shows a generic quadcopter drone 638 similar to that described in previous embodiments. The drone 638 includes a main body 640. A left front post 646 supports a left front propeller 648 and a left front propeller guard 650. A right front post 652 supports a right front propeller 654 and a right front propeller guard 656. A left rear post 658 supports a left rear propeller 660 and a left rear propeller guard 662. A right rear post 664 supports a right rear propeller 666 and a right rear propeller guard 668.

In the droneboarding mechanical flight control system 600 of FIG. 9, the one or more tension lines of previous embodiments have been replaced by rods or poles 602, 604, 606. The droneboarding mechanical flight control system 600 shown in FIG. 9 includes a center tension rod 602, a left tension rod 604, and a right tension rod 606. As with the tension lines of previous embodiments, alternative arrangements with more or fewer tension rods may be employed without deviating from the inventive concept of the present invention.

Tension rod attachment structures 608, 610, 612 may be formed at various locations on the drone 638. In the embodiment depicted in FIG. 9, a center tension rod attachment structure 608 is formed near the center of a back surface of the main body of the drone. A left tension rod attachment structure 610 is formed on a left surface of the main body of the drone. A right tension rod attachment structure 612 is formed on a right surface of the main body of the drone. Alternatively, the tension rod attachment structures 608, 610, 612 could be formed elsewhere on the drone, such as on the posts 646, 652, 658, 664, or on the propeller guards, 650, 656, 660, 668, for example. The tension rods 602, 604, 606 are joined to the tension rod attachment structures 608, 610, 612 by means of detachable hooks or clips 670, 672, 674 or some similar mechanism attached to the ends of the tension rods 602, 604, 606.

Left and right handles 614, 616 may be formed at the ends of the left and right tension rods 604, 606, respectively. A stabilizing member 618 may be similarly formed at the end of the center tension rod 602. The stabilizing member 618 extends and attaches to the left and right handles 614, 616 and is provided to maintain a desired spacing between the left, right and center tension rods 604, 602, 606, and the two handles 614, 616. A droneboarder employing the mechanical flight control system 600 grips the handles 614, 616 to be pulled along by the drone 638. The droneboarder may also manipulate the handles 614, 616 to push and pull various quadrants of the drone 638 farther away or nearer to the droneboarder's body in order to influence the flight path of the drone 638 in the manner described with regard to other embodiments. The tension rods 602, 604, 606 may comprise a plurality of telescoping, hinged, threaded, or otherwise collapsible or detachable segments 620 so that the tension rods 602, 604, 606 may be collapsed for convenient transport and storage.

Figure 10:
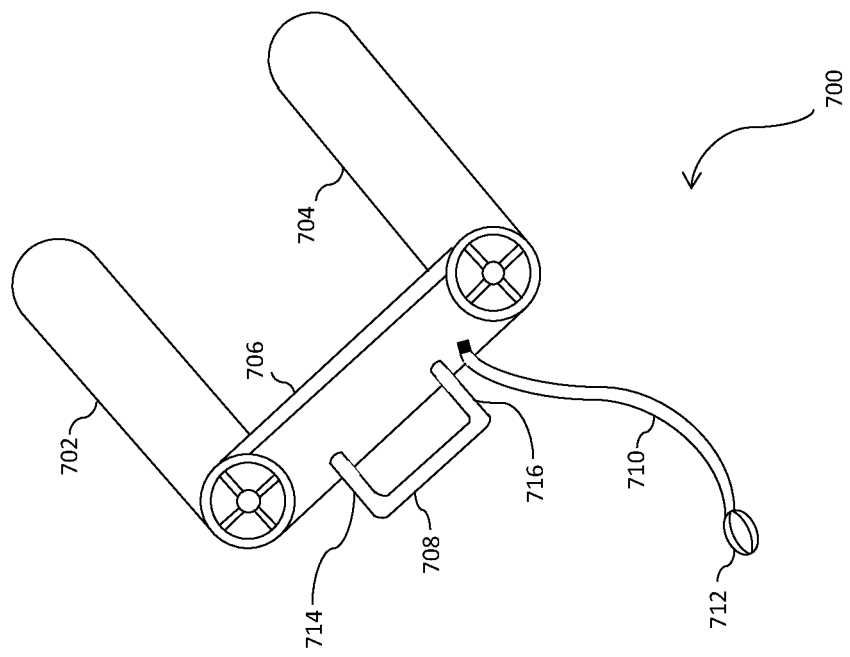
FIG. 10 depicts a droneboarding system according to yet another embodiment of the invention.

Turning to FIG. 10, yet another embodiment of a drone boarding mechanical flight control system 700 is depicted. According to this embodiment, a handle 708 formed between truncated rods 714, 716 may be attached directly to the drone itself. The truncated rods may include threaded ends and may be secured by nuts or by pins or some other attachment structure or securing mechanism (not shown) located on the opposite side of the midpiece 706. With this arrangement, the droneboarder may grip the handle 708 and manipulate the orientation of the drone directly to influence the drone's flight path.

An alternatively designed drone is depicted in the embodiment shown in FIG. 10. A pair of electric jet propeller engines 702, 704 are attached to each end of a crossbeam or midpiece 706. The handle 708 is attached to the mid piece 706. Although shown as a single rectangular shaped member extending from the mid piece 706, the handle 708 could also comprise separate left and right handles, or could have a shape significantly different from the rectangular shape shown in FIG. 10. A safety leash 710 may be provided with an ankle or wrist band 712 that may be worn on the droneboarder's ankle or wrist. In the event of a fall in which the droneboarder releases the handle 708, the safety leash will be pulled from an onboard safety leash connector causing the drone to enter a safe operating mode. The safe operating mode may entail the drone hovering in place, coming to a controlled landing, or following some other safe operating protocol. Despite the alternate drone design shown in FIG. 10, it should be noted that the handle 708 could also be applied to the common quadcopter design depicted in earlier described embodiments.

Figure 11:
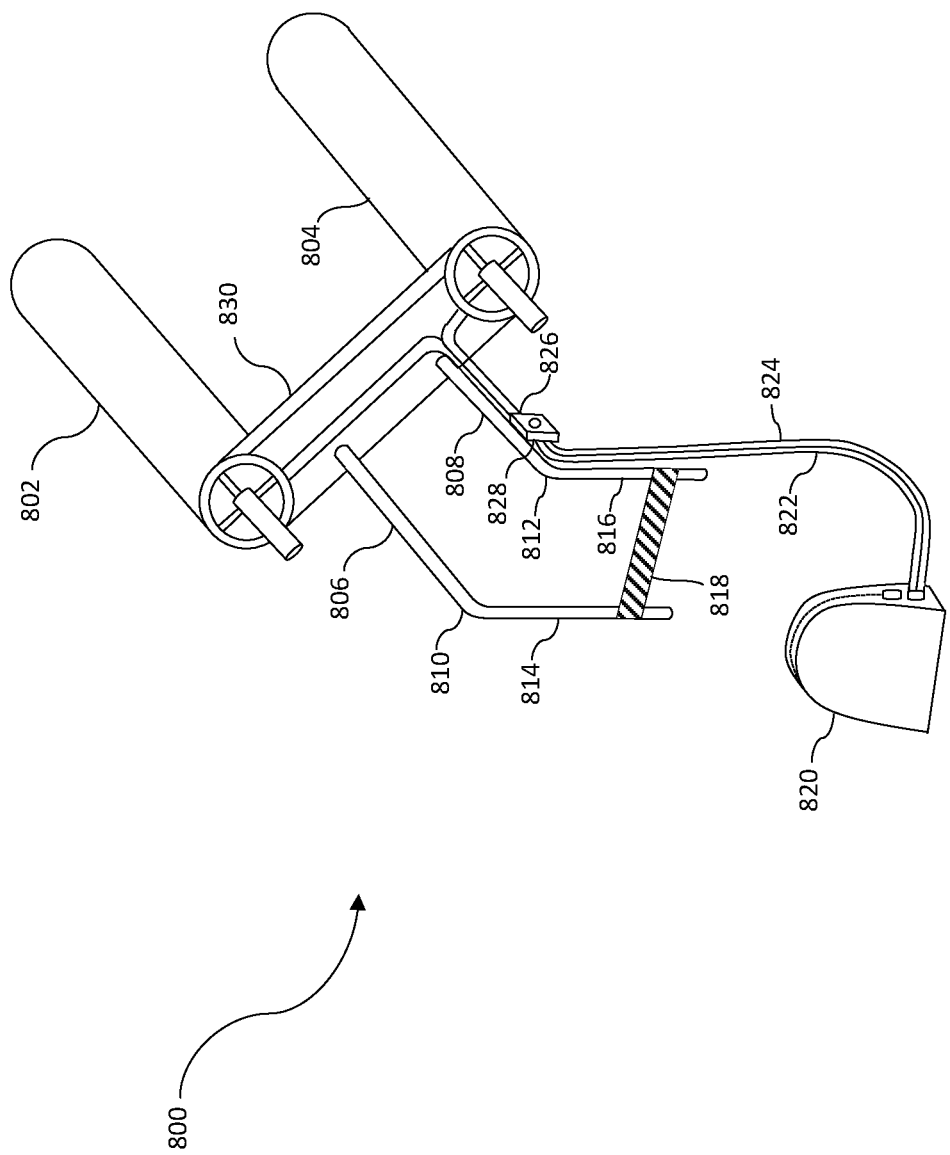
FIG. 11 depicts a droneboarding system according to still another embodiment of the invention.

FIG. 11 shows an embodiment of a droneboarding mechanical flight control system 800 similar to that shown in FIG. 10. Like the embodiment of FIG. 10, the drone comprises left and right jet propellers 802, 804 joined by a midpiece 830. In the embodiment of FIG. 11, however, rather than a single handle, a pair of rods 806, 808 extend from the midpiece 830. 90° bends 810, 812 located approximately midway along the length of the rods 806, 808 define lower leg portions 814, 816. A strap 818 made of fabric or some other material extends between the lower leg portion 814 of the left rod 806 and the lower leg portion 816 of the right rod 808. The strap 818 may rest across the droneboarder's thighs while the droneboarder grips the lower legs 814, 816 of the left and right rods 806, 808 at points near the two 90° bends 810, 812.

The droneboarding mechanical flight control system 800 is shown with a remote battery pack that may be carried in a backpack 820 that may be worn by the droneboarder. Electrical power may be carried from the back pack 820 to the electric powered jet propellers 802, 804 by way of a pair of electrical conducting cables 822, 824. The cables 822, 824 may be connected to an adjustable rheostat 826. The Rheostat may be adjusted to control the electrical current provided to the jet propellers to throttle the craft. A power switch 828 may also be provided to connect/disconnect the electrical power supplied to the jet propellers 802, 804.

Various embodiments of the invention have been described and illustrated; however, the description and illustrations are by way of example only. Other embodiments and implementations are possible within the scope of the invention and will be apparent to those of ordinary skill in the art. Therefore, the invention is not limited to the specific details of the representative embodiments and illustrated examples in this description. Accordingly, the invention is not to be restricted except as necessitated by the accompanying claims and their equivalents.

The invention claimed is:

1. A droneboarding system comprising:
an electrically powered aerial drone having a body and at least one rotary propeller attached to the body;
a tow handle;
a left tension rod extending between a left side of the tow handle and a left tension rod attachment structure located on a left side of the electrically powered aerial drone body; and
a right tension rod extending between a right side of the tow handle and a right tension rod attachment structure located on a right side of the electrically powered aerial drone body;
the tow handle mechanically influencing an in-flight orientation of the electrically powered aerial drone via the left, right and center tension rods to control a flight path of the electrically powered aerial drone.

2. The droneboarding system of claim 1 further comprising a center tension rod extending between a center of the tow handle and a center tension rod attachment structure on the body of the electrically powered aerial drone, the center tension rod attachment structure being one of aft of the left and right tension rod attachment structures and forward of the left and right tension rod attachment structures.

3. The droneboarding system of claim 2 wherein the center tension rod attachment structure is located aft of the left and right tension rod attachment structures.

4. The droneboarding system of claim 3 wherein the left tension rod attachment structure is located in a left front quadrant of the electrically powered aerial drone, and the right tension rod attachment structure is located in a right front quadrant of the electrically powered aerial drone.

5. The droneboarding system of claim 2 wherein the center tension rod attachment structure is substantially forward of the left and right tension rod attachment structures.

6. The droneboarding system of claim 5 wherein the left tension rod attachment structure is located in a left rear quadrant of the electrically powered aerial drone, and the right tension line attachment structure is located in a right rear quadrant of the electrically powered aerial drone.

7. The droneboarding system of claim 2 wherein the tow handle comprises a left hand grip, a right hand grip and a stabilizing member extending between the left hand grip and the right hand grip, and wherein the left tension rod is connected to the left hand grip and the right tension rod is attached to the right hand grip, and the center tension rod is attached to the stabilizing member.

8. The droneboarding system of claim 2 wherein the left tension rod, the right tension rod, and the center tension rod comprise multi-segment collapsible rods.

9. The droneboarding system of claim 2 wherein the left, right and center tension rods comprise telescoping segmented rods.

10. The droneboarding system of claim 2 wherein the left, right and center tension rods comprise detachable threaded segments.

11. The droneboarding system of claim 1 wherein the left tension rod and the right tension rod each include a bend between first and second ends thereof to define lower leg portions of the left and right tension rods, the droneboarding system further comprising a strap extending between the lower leg portion of the left tension rod and the lower leg portion of the right tension rod.

12. The droneboarding system of claim 1 wherein the center tension rod attachment structure is aft of the left and right tension rod attachment structures.

13. A droneboarding flight control system comprising:
an electrically powered aerial drone having a body and at least one rotary propeller attached to the body;
a handle; and
one or more tension rods connected between the handle and the body of the electrically powered aerial drone, whereby a user gripping the handle may mechanically influence the flight path of the electrically powered aerial drone via the handle and the one or more substantially rigid rods.

14. The droneboarding flight control system of claim 13 wherein the one or more tensions rods comprises a left rod, a right rod and a center rod.

15. The droneboarding flight control system of claim 14 wherein the handle comprises a left hand grip attached to the left rod, a right hand grip attached to the right rod, and a stabilizing member attached to the center rod and extending between the left hand grip and the right hand grip.

16. The droneboarding flight control system of claim 13 wherein the one or more tension rods comprise a left rod and a right rod, each of the left rod and right rods including a bend therein to define lower leg portions thereof, the handle comprising a portion of the lower leg portion of the left rod and a portion of the lower leg portion of the right rod, the flight control system further comprising a strap extending between the lower leg portion of the left rod and the lower leg portion of the right rod.

\* \* \* \* \*